United States Patent [19]

Kroeschell et al.

[11] Patent Number: 5,152,418
[45] Date of Patent: Oct. 6, 1992

[54] CONTAINER WITH SEALED CLOSURE

[75] Inventors: Frank Kroeschell, Langen; Kurt Huth, Cremlingen; Klaus-Dietrich Geske, Bremervörde, all of Fed. Rep. of Germany

[73] Assignee: Schmalbach-Lubeca AG, Braunschweig, Fed. Rep. of Germany

[21] Appl. No.: 587,393

[22] Filed: Sep. 25, 1990

[30] Foreign Application Priority Data

Oct. 23, 1989 [DE] Fed. Rep. of Germany ....... 3935201

[51] Int. Cl.$^5$ ............................................. B65D 41/00
[52] U.S. Cl. .................................... 220/359; 220/613
[58] Field of Search ............... 220/613, 359, 307, 258, 220/612

[56] References Cited

U.S. PATENT DOCUMENTS

| | | |
|---|---|---|
| 3,979,015 | 9/1976 | Arfert ................................. 220/307 |
| 4,300,700 | 11/1981 | Chang ................................. 220/307 |
| 4,529,100 | 7/1985 | Ingemann ........................... 220/359 |
| 4,589,568 | 5/1986 | Ito et al. ............................. 220/359 |
| 5,055,215 | 10/1991 | Mains et al. ........................ 220/359 |

FOREIGN PATENT DOCUMENTS

| | | |
|---|---|---|
| 309189 | 3/1987 | European Pat. Off. . |
| 2540163 | 3/1976 | Fed. Rep. of Germany . |

*Primary Examiner*—Joseph Man-Fu Moy
*Attorney, Agent, or Firm*—Barnes, Kisselle, Raisch, Choate, Whittemore & Hulbert

[57] ABSTRACT

A package is provided which consists of a container bottom made of thin-walled plastic, a narrow opening edge and a closure made of a sheet, which are joined with high strength and high tightness by heat-sealing in that two separate sealing zones are provided between the two parts, one of which primarily serving to achieve the high mechanical strength and the other primarily serving to achieve a high hermetic seal.

8 Claims, 3 Drawing Sheets

CONTAINER WITH SEALED CLOSURE

FIELD OF INVENTION

Hollow containers with wall enclosures sealed by a closure member over the open end.

The present invention relates to a package as a container, particularly made of plastic or composite plastic material with an opening edge of small wall thickness and a closure made of sealable or weldable sheet material which is adapted to be connected with the opening edge in a mechanically resistant and hermetically sealed manner by heat-sealing or welding.

BACKGROUND AND FEATURES OF THE INVENTION

As is well known, such can-like packages have primarily been used up to now for accommodating powdery material or dry products. In this case, the container body frequently consists of wound paper or cardboard material which can be produced with very exacting tolerances as regards wall thickness and diameter. Thus, it is possible to close the container with a sheet by means of heat-sealing. The sheet used is usually made of composite material, e.g., aluminum/plastic. Since the edge end surface of the container member does not suffice for a sufficiently firm and tight seal seam, the sheet has to be placed in a U-shape on the container edge and sealed with the inner container surface and/or the outer container surface. The container closed in such a way can additionally be covered with a reclosable cover.

With very exacting tolerances, e.g., below 0.5 mm for the diameter of the container edge, integral seal heads moving into the container edge may be used for sealing. In this case, it is possible to produce a seal seam having sufficient strength and gas-tightness. Although an internal seal can also be achieved with dimensional tolerances above 0.5 mm, this is only possible by means of an expanding seal arbor. Although sufficient mechanical strength can optionally be obtained therewith, the danger exists that less tightly sealed areas are formed at the junctures of the expanding arbor elements, so that an absolutely gas-tight connection cannot be guaranteed between the parts.

In addition, such packages are also used for contents which are to be sterilized. In this case, the connection between the container parts has to have a particularly high mechanical strength so as to receive the different pressures occurring during sterilization without any problems.

In other fields of application, extraordinary great demands are made on the hermetic seal, particularly in the case of oxygen-susceptible package contents.

The object of this invention is to further develop a package having features such that the indicated problems and drawbacks are avoided and high mechanical connecting strength and particularly high gas-tight hermetic connection can be achieved, also for containers, whose bottom edge openings are subject to major dimensional fluctuations, e.g., above 0.5 mm.

This problem is solved by providing a closure for the open end of a container having a small thickness, the closure being made of a sealable or weldable sheet material connected to the edge of the open container end in a mechanically resistant and hermetically sealed manner by heat sealing or welding to an area of the container which is inclined relative to the axis of the container. In general, the connection area between the container and the closure is divided into at least two different areas, one of which is primarily developed as a mechanically resistant connecting area, and the other is primarily developed as a hermetically sealed connecting area.

It is essential to assign the seal connection to an inclined surface.

Due to the division of the seal connection into two different areas, attention can be focused on either sufficient mechanical strength or gas-tight hermetic seal in each seal area by process control and geometrical configuration. In the area of high strength, microchannels or the like may be tolerated, since a hermetic seal is effected in the other areas. It will not be required for these areas to achieve the desired resistance to pressure if it is ensured that these hermetically sealed areas are relieved or saved from possible, increased internal pressures or the like by the other areas of increased seam strength. In many cases, one seal surface will already be sufficient if it is arranged conically over a relatively large surface.

The seal surface area of an inner edge surface which has an inclination predetermined as compared to the container axis is referred. Despite sealing along an inner surface, one advantage thereof is that a one-piece seal head may be used so as to minimize the danger of microchannels. Above all, this implies the advantage of obtaining the desired sealing property in this area even with greater tolerances, e.g., above 0.5 mm up to 2.5 mm.

Further advantageous features will be apparent in the following description and the same applies to the process measures for the production of the package.

BRIEF DESCRIPTION OF THE DRAWINGS

By way of schematic drawings, the invention is explained in more detail hereinafter by means of several embodiments, in which.

DETAILED DESCRIPTION OF THE INVENTION AND THE MANNER AND PROCESS OF USING IT

Figure 1:
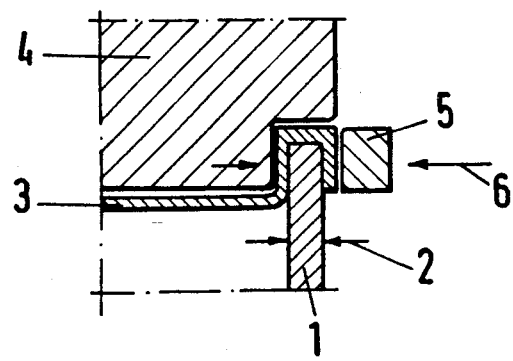
FIG. 1 is a detail and cross-sectional view of a conventional package and its pertinent sealing tools.

FIG. 1 shows a package made of a bottom 1 having a cylindrical edge of small thickness (0.5 to 3 mm). The bottom is closed by means of a sheet 3 which may be a composite sheet consisting of aluminum and plastic or a plastic sheet. A connection is made by heat-sealing. To this end, the edge portion of the sheet is placed in U-shape around the open edge of the container bottom 1.

Sealing is effected by a seal die 4 and a holder 5. If the diametral tolerance of the container 1 is below 0.5 mm, sealing can be achieved by means of a one-piece sealing die 4 which is forced into the package from above with a correspondingly tight fit, the package being embraced by the holder 5 with correspondingly tight fit. Such a procedure requires that the very exacting dimensional tolerances be observed. The sealing pressures achievable are limited. If higher sealing pressures shall be achieved or higher tolerances shall be overcome, the seal head will have to be developed as a radially extending head. Although this permits sufficiently high seal forces to be exerted in radial direction 6, it implies the danger that areas of reduced sealing strength develop between the split elements of the expanding head; gases such as oxygen may enter these areas through microchannels and reach the container interior. In this way, it is not possible to produce containers having increased dimensional tolerances, sufficient strength and sufficient tightness. Considerable dimensional tolerances will have to be accepted if using bottoms made of plastic. They are above 0.5 mm and result in values up to, e.g., 2.5 mm depending on the material, mode of opening and shrinkage behavior of the material. Sealing connections as illustrated in FIG. 1 are not promising for such containers.

Figure 2:
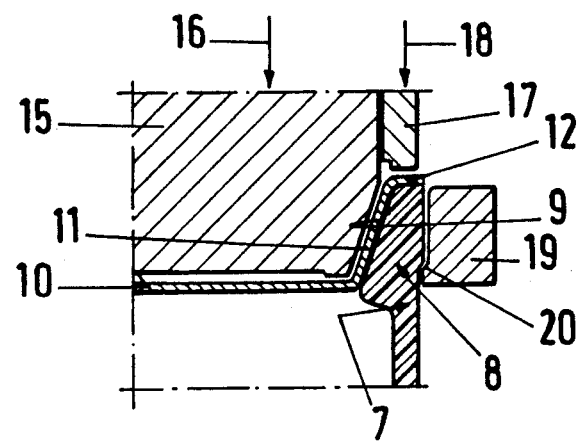
FIG. 2 is a package according to the invention also with pertinent production tools.

FIG. 2 shows a package according to the invention. The bottom 7 is made of plastic. A profile is shaped to its opening edge 8, which substantially offers an interior surface 9 slightly inclined with respect to the container axis. An end face pointed axially borders thereon. The exterior of the profile edge 8 is provided with a shoulder. For closing the container, a design is provided primarily with a preferably divided holder 19 preferably divided and arranged such that it radially embraces the profiled edge 8 from outside and extends, below the outer shoulder of the edge 8 by means of a shoulder 20 so as to downwardly support the edge in axial direction as well.

A single sheet or composite sheet 10 serves to close the container. This sheet may be pre-shaped and, in this case, has a recess defined by a conical wall surface 11 whose inclination corresponds approximately to the inclination of the conical inner surface 9 of the edge 8. An edge flange 12, which extends approximately at right angles to the container axis and is of minor width, borders on the conical wall.

A one-piece seal head 15 is provided to seal the two parts, which is moved axially into the recessed sheet 10 in accordance with arrow 16. The seal head 15 is surrounded by a second seal ring 17 which is also moved axially in accordance with arrow 18. In FIG. 2, it is assumed that the seal tools 15 and 17 are axially moved independently of each other by separate drives or means. As is obvious, the conical wall element 11 is formed with increasing pressure against the inclined surface 9 of edge 8 when feeding the seal head 15. Since the edge is supported in both axial and radial direction, it cannot escape, but safety receives the corresponding sealing pressures so as to achieve high-strength sealing.

In order to obtain an absolutely hermetic seal and exclude micro gas channels in any case, the seal ring 17 is placed onto the narrow edge flange 12 with correspondingly high pressure, so that a second seal area results here which, relating to space and its geometric configuration, differs from the seal area inclined with respect to the axis.

The arrangement according to FIG. 2 is assumed to start from a pre-shaped closure 10.

Figure 3:
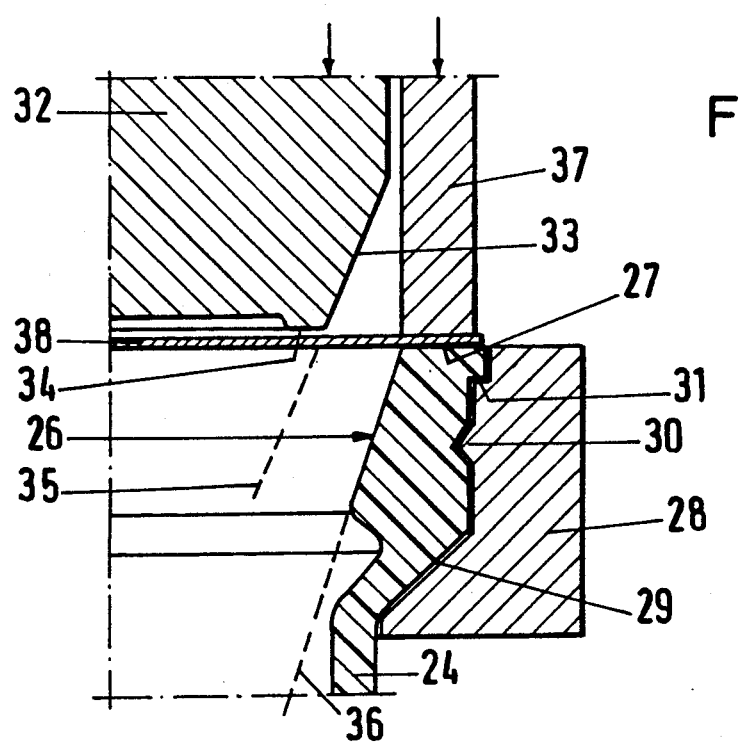
FIG. 3 is a modified embodiment of the package and a modified kind of production and sealing on a larger scale.

FIG. 3 shows that one may also start from a flat sheet material 38. It is placed on the end face 27 of the edge of the container bottom 24 and kept in this position by means of the seal ring 37. The profiled edge of the container 24 is again supported radially outwards and axially downwards by a divided holding ring 28. Varying positive engagement elements may be provided simultaneously or alternately. The end face 27 of the edge may be widened by a short flange to form a shoulder 31. Furthermore, an outwardly open, V-shaped engagement groove may be provided in the peripheral surface of the edge, into which a corresponding rib 30 of the holder 28 positively engages. Finally, the edge may have an inclined shoulder, below which a correspondingly beveled section 29 of the holder 28 extends. A reliable support of the edge by the holder 28 is of considerable importance for the purpose of this invention, since this does not only serve to safely receive the forces of pressures required for sealing without deforming the container consisting of relatively thin material. The container edge is also fixed reliably in its position by the holder 28 so as to enable accurate sealing.

When lowering the seal head 32, the sheet 38 is initially deep-drawn, part of the sheet abutting against the inclined inner surface 26 of the container edge and being pressed against the inclined surface 26 with the necessary seal pressure by the corresponding inclined surface 33 of the seal head 32. The bottom side of the seal head 32 is provided with an annular projection or bead 34 for the purpose of safe holding and deforming and guaranteeing the necessary pressing operation.

The inclination of the slanting seal surface 26 may be between 5° and 30° and should preferably be between 10° and 20°, particularly 15°, as indicated at 36 in FIG. 3. The inclination 35 of the truncated cone surface 33 of the seal head 32 may equal or slightly differ from the inclination 36 of the inclined surface 26. If a deviation is desired, the two slanting surfaces should slightly diverge downwards and towards the container interior as shown in FIG. 3. It is important that the inclined surface 26 has a sufficiently expansive surface transverse to the peripheral direction so as to obtain high mechanical strength. It proved expedient that the axial length of the inclined surface be between about 4 and 6 mm.

A second sealing is effected in the area of the end face 27 by means of the seal ring 37. It is assumed that seal ring 37 and seal head 32 can be actuated independently of each other. For example, the sealing in the end surface 27 may be effected simultaneously with the sealing at the inclined surface 26, or it may be carried out subsequently. In the latter case, the seal ring 37 first serves to hold down the edge of the sheet 38. The radial extent of the surface 27 is generally very small and is between about 1.5 and 3 mm, with the body wall thickness being about 0.5 to 1.5 mm. Here, sealing is effected by vertical pressure applied to the seal surface, so as to obtain a narrow annular seal strip of high tightness. For this, it is also important that the upper edge portion is reliably supported by the holder 28 and fixed in position.

Figure 4:
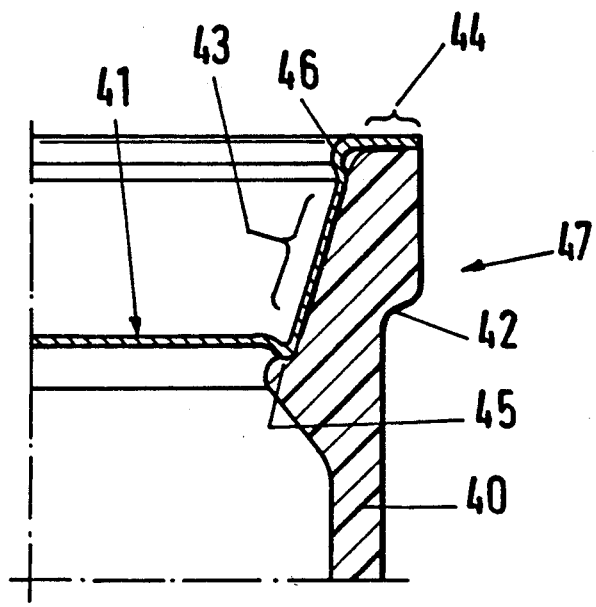
FIG. 4, is a detail and sectional view through a firmly and hermetically sealed package according to the invention on an enlarged scale.

FIG. 4 shows a closed package according to the invention. The two spaced-apart and geometrically separated sealing areas 43 and 44 can clearly be seen. The latter of these areas is provided at the axial end face of the container bottom 40, and the former is provided at the conical surface of the container edge 47. As also shown in FIG. 4, an inner shoulder of the container edge having the form of a bead 45 may border on the inner edge of the inclined surface and the seal head may be developed such that it additionally presses the sheet 41 at the bottom side against the bead 45 by means of a seal rib thereby creating a third linear seal zone.

Furthermore, a membrane-like juncture area 46 is provided on the sheet between the two seal zones 43 and 44 as shown in an exaggerated manner in FIG. 4. This area permits a considerable freedom of movement between the wall area of the sheet assigned to seal zone 44 and that assigned to zone 43. This movement area permits undisturbed compensation even of considerable dimensional tolerances which result in a more or less strong downward movement of the conical sheet wall area as compared to the sheet edge. Reference number 42 of FIG. 4 refers to a shoulder serving to secure the position of the container edge.

Figure 5:
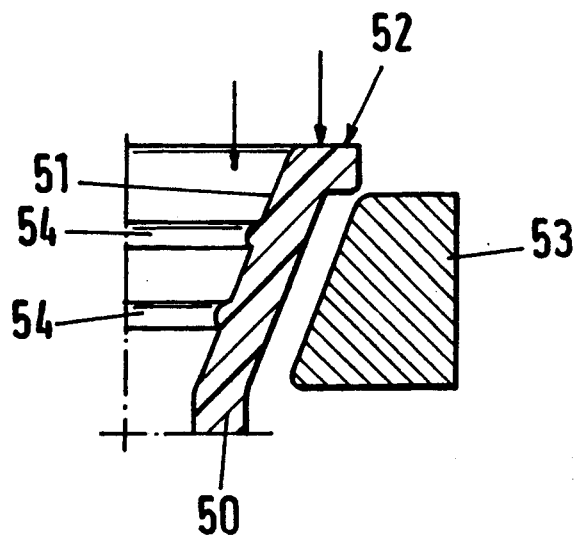
FIG. 5 is a further modified embodiment of the package.

In order to further improve hermetic seal and better exclude the formation of capillary gas channels, narrow annular beads or ribs 54 are provided in the inclined surface 51 of the edge of the container 50 according to FIG. 5. Once such rib also suffices. It slightly protrudes from the surface of the inclined face 51 and is drawn oversized in FIG. 5. When feeding the seal head, linearly increased seal pressures result in this manner, forming linearly hermetically tight seal zones within the inclined seal zone 43 in FIG. 4. These ribs or beads 54 and the resulting additional sealing zones are provided in addition to the sealing zone assigned to the end face 52 of the container edge. Reference number 53 refers to the outer holder.

As mentioned at the beginning, the closure element may be pre-shaped. Such a shape is shown in FIG. 2.

Figure 6:
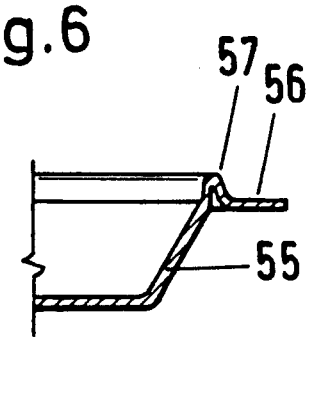
FIGS. 6 and 7 are two different embodiments of a prefabricated closure for the package according to the invention.
Figure 7:
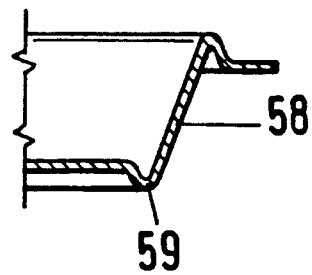

FIGS. 6 and 7 illustrate two further shapes of the prefabricated closure. In both embodiments, this closure is recessed and has a conical wall area 55 or 58 of major expansion transverse to the peripheral direction. In both cases, an edge flange 56, extending almost perpendicularly to the axis of the closure, borders externally thereon and is sealed with the end side of the container in FIG. 6, a membrane-like compensation bead 57 is provided between the two areas, which, for example, may have a smaller wall thickness and unfolds when the conical wall portion 55 has to cover a longer path as compared to the edge portion 56 to compensate greater dimensional tolerances.

In the embodiment according to FIG. 7, a corresponding membrane-like head 59 is provided between the conical wall portion and the plane bottom of the closure. It serves, for example, to form the linear third seal zone in combination with a shoulder 45 according to FIG. 4 an the inner side of the container edge.

Figure 8:
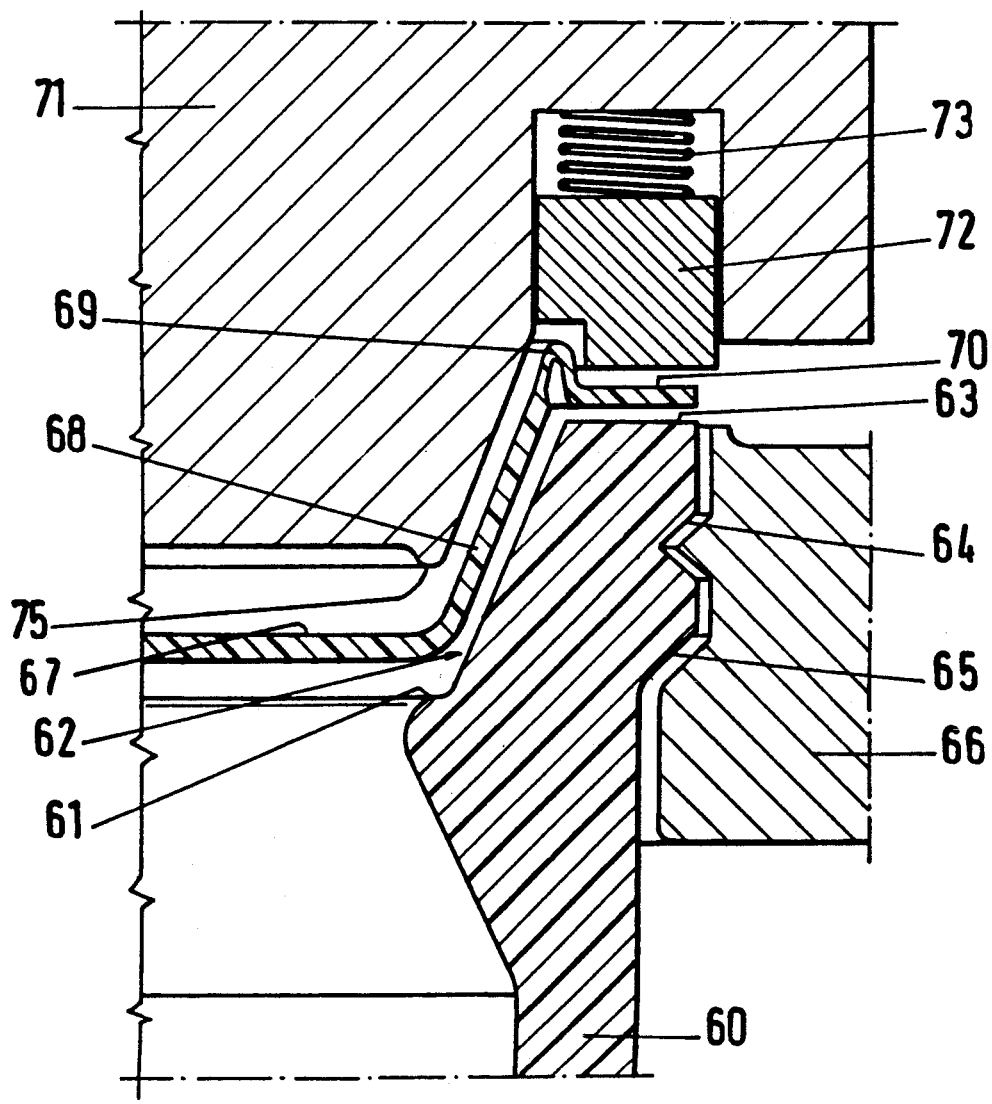
FIG. 8 is a modified embodiment of the package, similar to FIG. 3, in combination with a modified apparatus for hermetically closing and sealing the package.

FIG. 8 shows another embodiment, similar to that of FIG. 3. However, this embodiment starts from a preshaped closure 67, having a conical wall portion 68 connected with the edge flange 70 via a membrane-like compensation crimp 69. A seal ring 72 serves to seal the edge flange 70 with end face 63 of the container 60, which is guided inside the seal head 71 and is resiliently supported as compared thereto by means of a pressure spring 73. The seal ring 72 has a recess to receive the membrane-like crimp 69. Adjacent to the conical surface, the seal head 71 has an additional seal rib 75 which creates a linear seal zone of high tightness interacting with the inner shoulder 61 of the container.

The container edge is extensively supported radially outwards and axially downwards by the divided holder 66, a rib of which grips into the peripheral recess 64 and a shoulder of which grips below a corresponding inclined shoulder 65 of the container edge.

As mentioned above, the single plastic sheet or a composite sheet material may be used for the purpose of this invention. Sheets provided with one of the known tear-open mechanisms serving to open the package are also suitable.

In all embodiments, the seal head is made of one piece and may compensate for considerable dimensional tolerances without loss of sealing strength and hermetic seal due to the inclination of one seal zone as a function of the angle of inclination.

Moving the seal seam into an inclined surface alone results in both tighter and firmer seams as compared to the known packages of this kind. Thus, in some cases this measure is sufficient to considerably improve the package. It may be made even tighter by the bead in or at the narrower end of the conical seal seam, thereby already distributing the seam functions to two separate areas to a certain extent. Such separation yields particularly reliable, loadable packages.

This invention is especially suitable when both parts are to be joined by sealing, particularly heat-sealing. It may be used for single, sealable sheets or sheets or plates made of a composite material having a sealable surface or coating.

However, it is also advantageous to join the two parts by welding. For example, when using a composite material having an aluminum layer, particularly intermediate aluminum layer, the two parts can be joined in a particularly favorable manner by means of induction welding.

If a shoulder or rib slightly projecting inwards is provided in the area of the inclined or conical connecting surface, the two parts can also advantageously be joined by means of friction welding.

This invention enables the production of conventional parallel-walled containers with a plastic cover or a cover made of plastic and aluminum and to firmly and tightly join these parts when taking the measures defined in the claims into consideration.

We claim:

1. A package and closure comprising a container having a surrounding wall around an axis, a first open peripheral edge on said container lying in a plane essentially perpendicular to the axis of the container, and a second peripheral edge on said container within said first edge, angled inwardly and downwardly from said first edge, and a closure membrane of sealable material connected to said first and second edges by heat sealing, said closure membrane having an outwardly extending flange overlying and sealed to said first edge, and an inner conical peripheral area within said first edge overlying and sealed to said second edge.

2. A package and closure as defined in claim 1 in which said second edge has a slanting seal surface between 5° and 30°.

3. A package and closure as defined in claim 1 in which said second edge has a slanting seal surface between 10° and 20°.

4. A package and closure as defined in claim 1 in which said first edge has a thickness of between 0.5 and 3 mm.

5. A package and closure as defined by claim 1 in which at least one annular section of said membrane is looped in cross-section between said first perpendicular edge and said second conical area.

6. A package and closure as defined in claim 1 in which the axial extension of the inclined conical area is between 3 and 6 mm and preferably about 4–5 mm.

7. A package and closure as defined in claim 1 in which one or more continuous ribs are formed in said inclined conical area projecting inwardly of the container.

8. A package and closure as defined in claim 1 in which looped annular beads in cross-section are formed at the lower and smaller end of the inclined conical area and at the juncture of the upper and larger end of said inclined conical area and the first perpendicular edge.

* * * * *